United States Patent [19]

Abeywickrama et al.

[11] Patent Number: 5,028,839
[45] Date of Patent: Jul. 2, 1991

[54] FLUORESCENT LAMP FOR USE IN AQUARIA

[75] Inventors: Milroy G. Abeywickrama, East Barnet; Barry J. Newman, Harlow, both of England

[73] Assignee: Thorn EMI plc, London, England

[21] Appl. No.: 417,632

[22] Filed: Oct. 5, 1989

[30] Foreign Application Priority Data

Oct. 8, 1988 [GB] United Kingdom ................. 8823691

[51] Int. Cl.$^5$ ........................... H01J 1/62; H01J 61/48
[52] U.S. Cl. ...................................... 313/487; 313/486
[58] Field of Search ................................. 313/486, 487

[56] References Cited
U.S. PATENT DOCUMENTS 4,176,299 11/1979 Thornton, Jr. ..................... 313/487

Primary Examiner—Donald J. Yusko
Assistant Examiner—Brian Zimmerman
Attorney, Agent, or Firm—Fleit, Jacobson, Cohn, Price, Holman & Stern

[57] ABSTRACT

A fluorescent lamp for use in aquaria, the luminescent layer in said lamp comprising a mixture of red, green and blue phosphors, the red phosphor emitting predominantly in the spectral region of from 610 nm to 620 nm, the green phosphor emitting predominantly in the spectral region of from 540 nm to 545 nm and the blue phosphor having a peak emission wavelength between 430 nm and 480 nm with the half peak width not exceeding 80 nm, said red, green and blue phosphors being blended to form said mixture in such proportions that the color co-ordinates of the lamp employing said mixture on the CIE chromaticity diagram differ from the point x equals 0.300 and y equals 0.232 in any direction by no more than 10 standard deviations of color matching (SDCM). Aquaria employing such lamps are also disclosed and claimed.

7 Claims, 5 Drawing Sheets

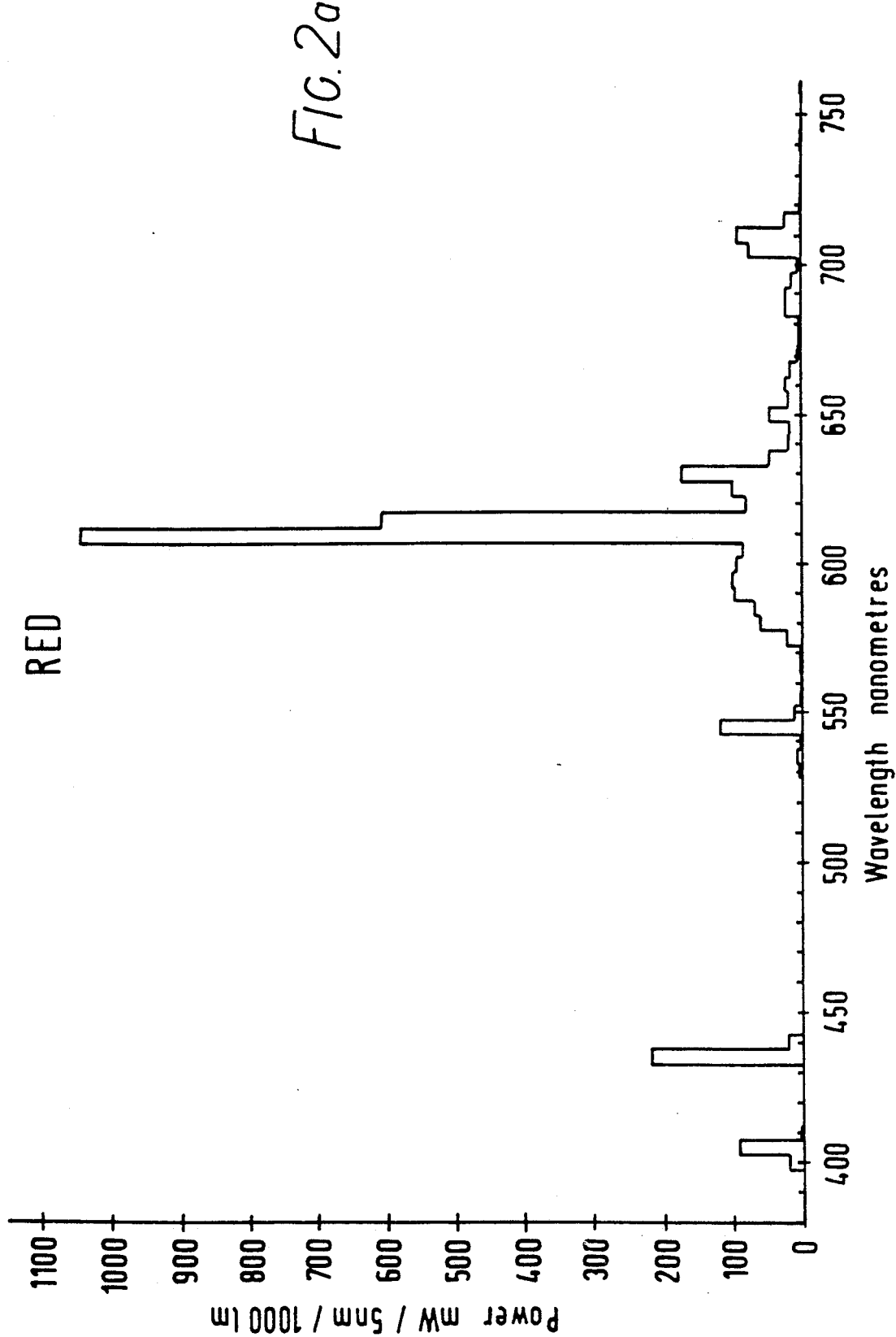

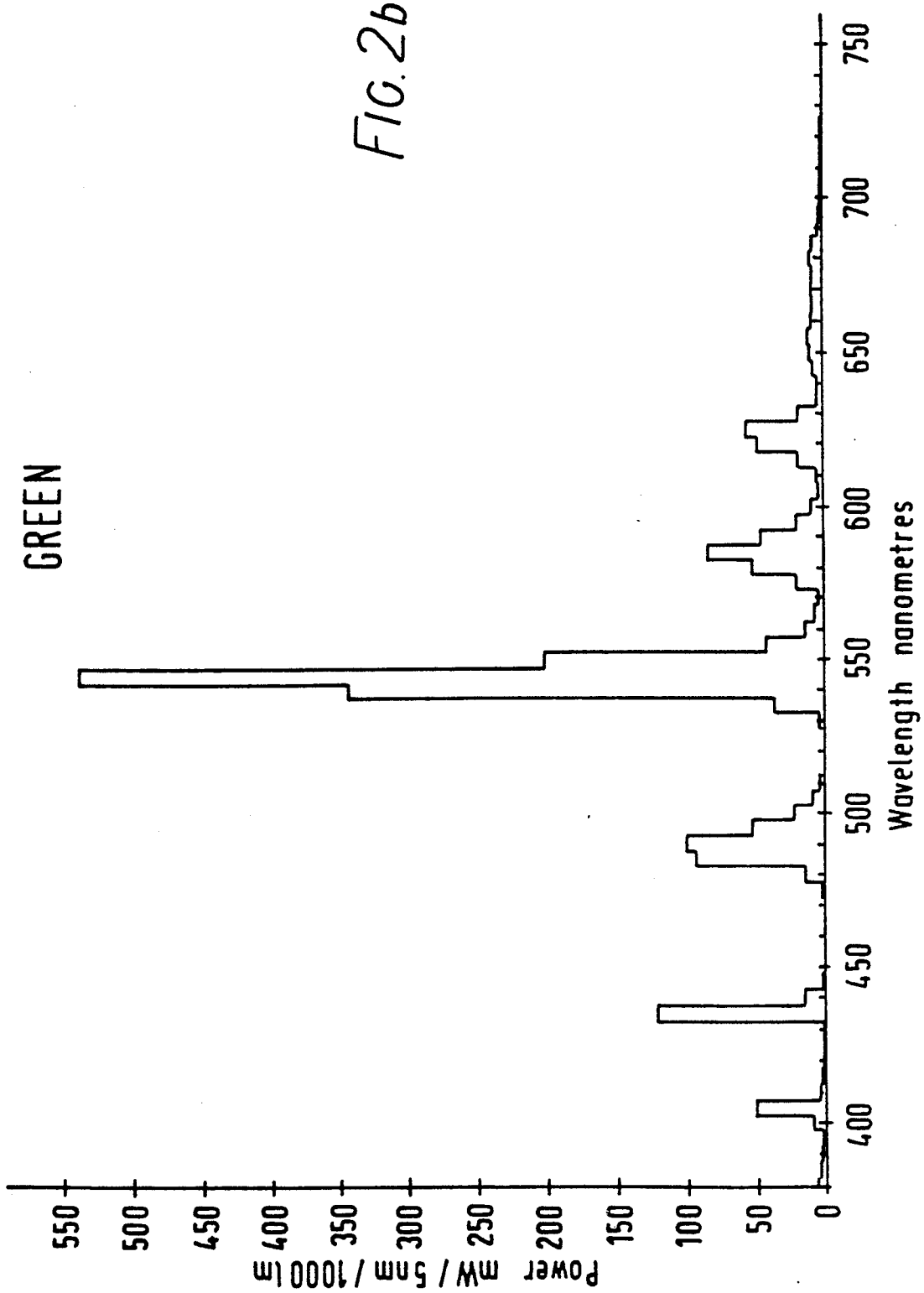

FLUORESCENT LAMP FOR USE IN AQUARIA

BACKGROUND OF THE INVENTION

This invention relates to aquarium lighting and, in particular to a fluorescent lamp for use in aquaria.

Aquaria, particularly the relatively small type for household use are commonly lit with fluorescent lamps. The type of fluorescent lamp most commonly used, whilst imparting a not unattractive reddish color to orangy objects, such as goldfish, suffers from the disadvantage that, since a reddish cast is also imparted to almost all colors, the many and varied varieties of fish now popular for small aquaria do not show up to best advantage. Further disadvantages of this lamp include low lumen output, poor lumen maintenance and a large color drift with age affecting both lamp appearance and color rendering.

SUMMARY OF THE INVENTION

It is an object of the present invention to provide a lamp for use in aquaria which does not suffer from the above disadvantages.

Accordingly we provide a fluorescent lamp for use in aquaria, the luminescent layer in said lamp comprising a mixture of red, green and blue phosphors, the red phosphor emitting predominantly in the spectral region of from 610 nm to 620 nm, the green phosphor emitting predominantly in the spectral region of from 540 nm to 545 nm and the blue phosphor having a peak emission wavelength between 430 nm and 480 nm with the half peak width not exceeding 80 nm, said red, green and blue phosphors being blended to form said mixture in such proportions that the color co-ordinates of the lamp employing said mixture on the CIE chromaticity diagram differ from the point x equals 0.300 and y equals 0.232 in any direction by no more than 10 standard deviations of color matching (SDCM). Most preferably, the lamp' of our invention has the color co-ordinates x equals 0.300 and y equals 0.232.

Individual red, green and blue phosphors which may be used to form the above mixture are well known in the art and we have found that suitable such phosphors include the following:

Red phosphor

Yttrium and/or gadolinium oxides activated by trivalent europium and having the following formula:

$(Y_aGd_{1-a})_2O_3: Eu^{3+}$

In the preferred case a is 1, i.e. the phosphor is $Y_2O_3: Eu^{3+}$

Green Phosphor

Calcium and terbium activated aluminates, silicates, phosphates and borates selected from compounds of the following formulae $CeMgAl_{11}O_{19}: Tb$ $Y_2SiO_5: Ce, Tb$ $LaPO_4: Ce, Tb$ $LaMgB_5O_{10}: Ce, Tb$ Particularly suitable are:

$CeMgAl_{11}O_{19}: Tb$ and $LaPO_4: Ce, Tb$

Blue Phosphor

Alkaline earth hexagonal aluminates of the B-alumina structure, or alkaline earth chlorophosates, each activated by divalent europium and having the following formula $BaMgAl_{10}O_{17}: Eu^{2+}$ $BaMg_{1.7}Al_{20}O_{32.7}: Eu^{2+}$ $BaMg_2Al_{24}O_{39}: Eu^{2+}$ $(Sr,Ca,Ba)_{10}Cl_2(PO_4)_6: Eu^{2+}$

BRIEF DESCRIPTION OF THE DRAWINGS

In order that the invention may be fully understood and readily carried into effect it will now be described by way of example with reference to the drawings, of which:

FIGS. 2a to 2c are spectra of red, green and blue phosphors respectively.

DETAILED DESCRIPTION OF THE INVENTION

As stated above, in order to produce the mixture for use in the luminescent layer of the lamp of the present invention, it is necessary to blend the three selected phosphors in such proportions that the lamp has the desired color co-ordinates. The procedure for producing the correct blend is well known to experts in the art and the specific example set out hereinafter describes this more particularly. Those skilled in the art will readily appreciate that since there are many factors other than weight proportions which affect the contribution of each phosphor in a mixture to the color of a lamp employing a phosphor layer comprising such a mixture it is not meaningful to lay down a particular weight proportion for each component of the mixture which will result, in all cases, in a lamp having the desired color co-ordinates.

These other factors, which cause the required weight proportions to vary, include (among other possible ones) particle size profiles of the component phosphors, relative efficacies of the component phosphors, relative bulk densities of the component phosphors, size and loading of lamp using the phosphor mixture.

Figure 1A:
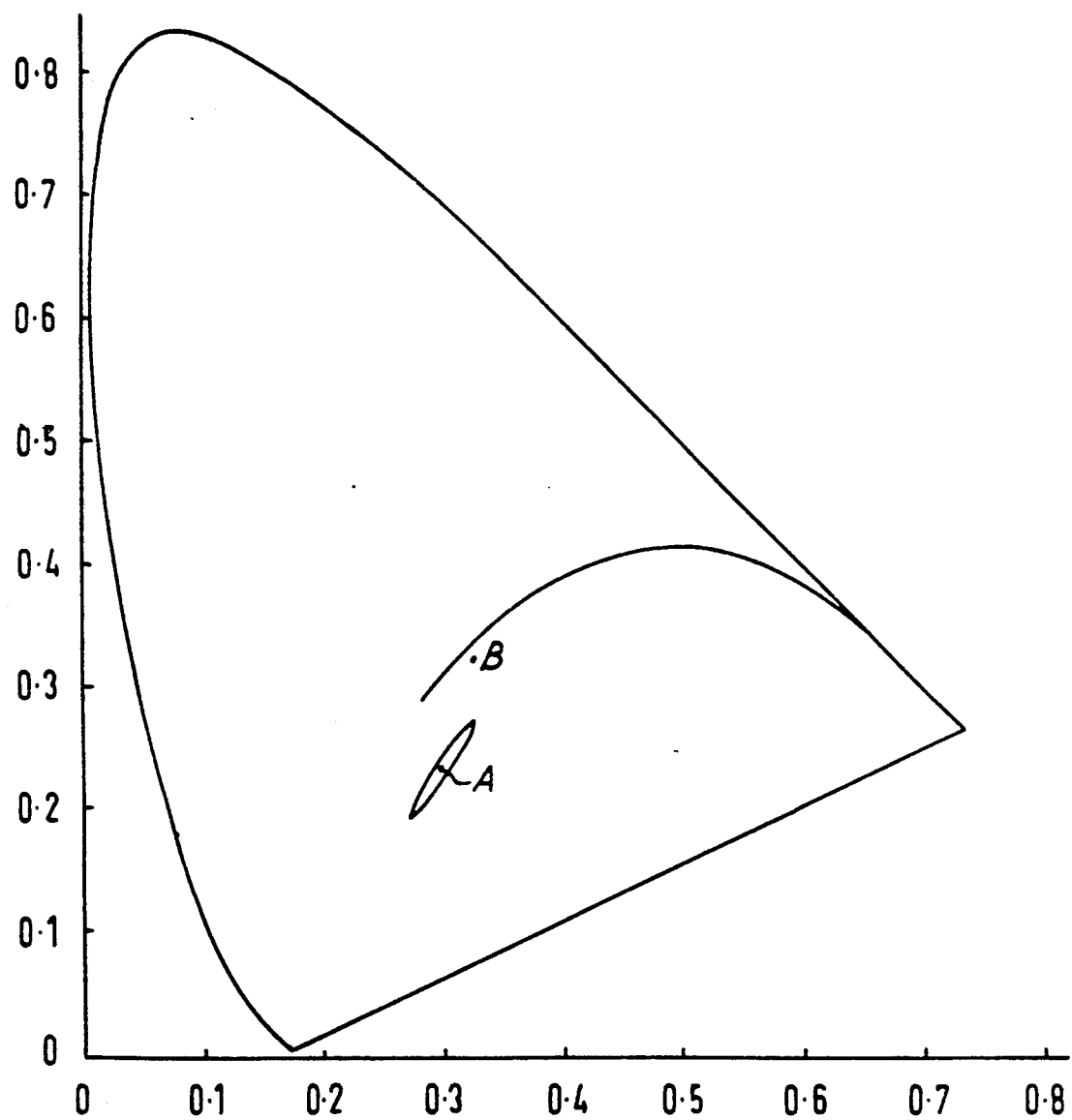
FIG. 1a is a CIE diagram on which is illustrated a point having the desired color characteristics and an ellipse covering points within ten standard deviations of color matching.
Figure 1B:
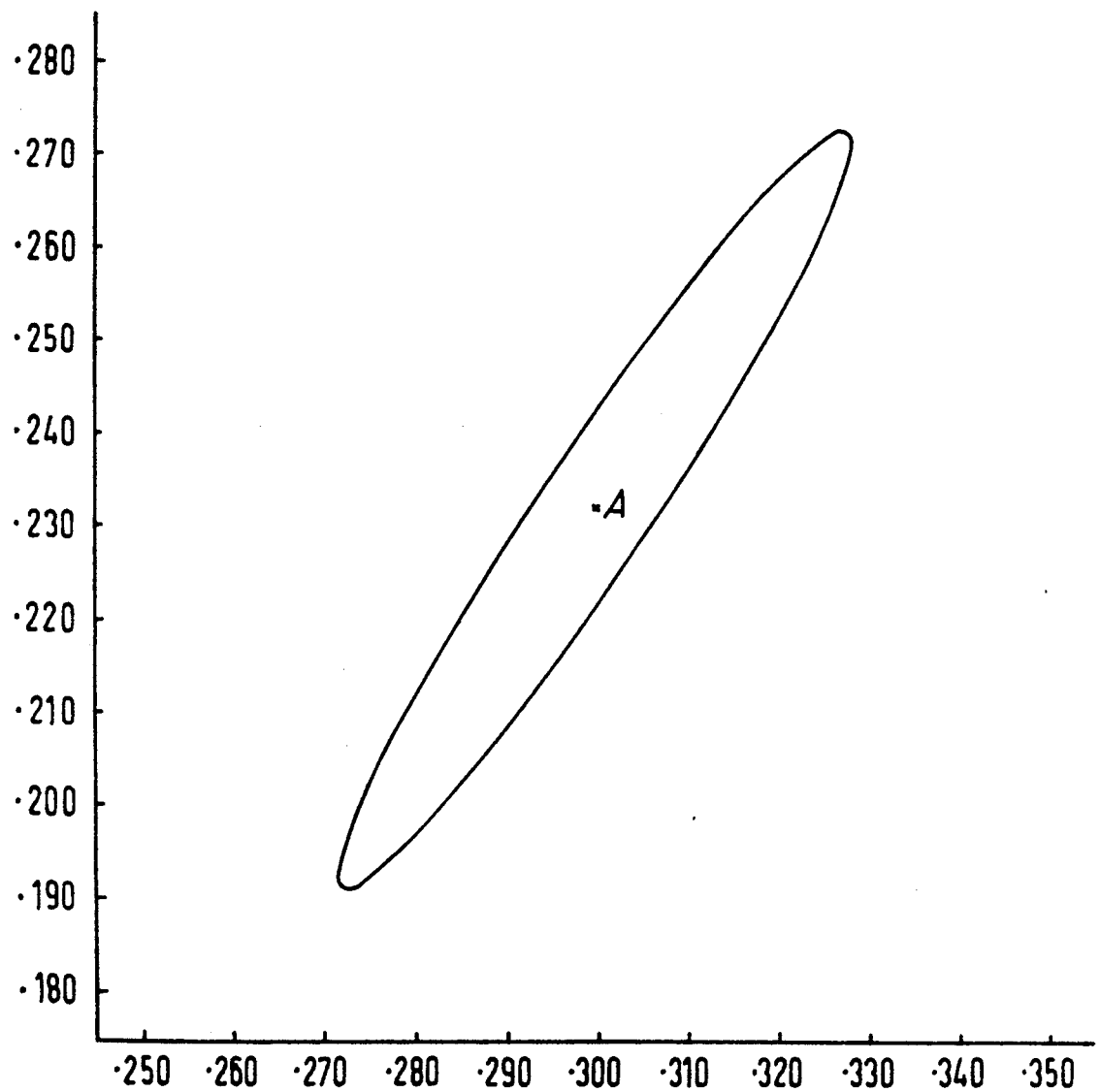
FIG. 1b is a CIE diagram showing the ellipse to a greater scale.

In the attached FIG. 1a there is reproduced the CIE chromaticity diagram in which is marked the point A which has the co-ordinates x=0.300 and y=0.232. Also shown in the form of an elipse centred on A is the area covering all points in any direction within 10 SDCM of the point A. The nature of this 10 SDCM elipse can be more clearly seen on FIG. 1b which is an enlargement of the relevant portion of the CIE chromaticity diagram. It will be seen that the point A is in a significantly different position on the diagram from that occupied by the co-ordinates of a lamp which prior to this invention was commonly used in aquaria and which are shown by point B on the CIE diagram of FIG. 1a.

The invention may be illustrated by the following example

EXAMPLE

Figure 2C:
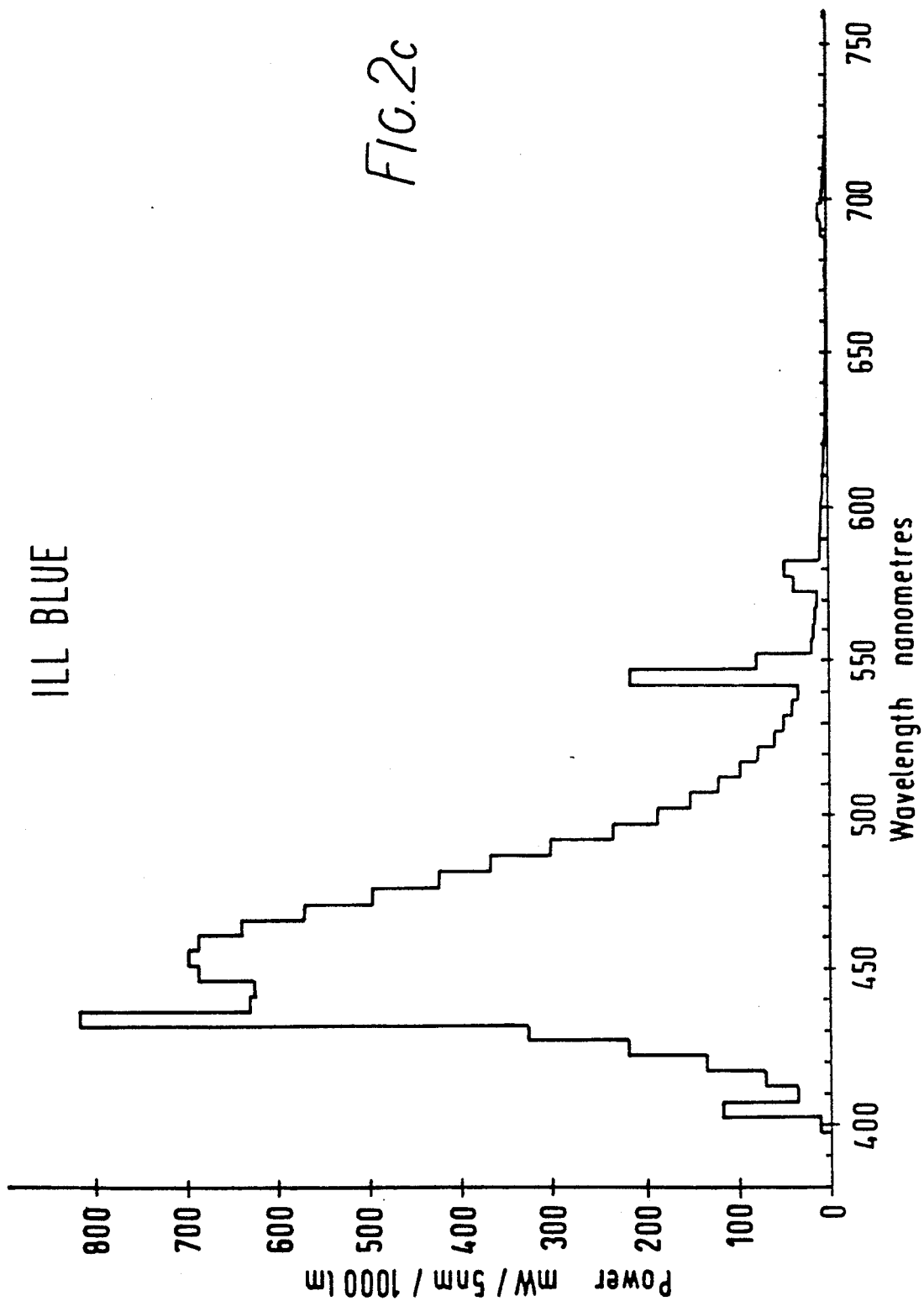

A mixture of phosphors was prepared from the following three materials (a) Red Phosphor Yttrium oxide activated with trivalent europium as commercially supplied by Elgar Phosphors & Chemicals Ltd., Lincoln Road, Enfield, Middlesex, under the code number 2005. This material, when illuminated by the ultraviolet light produced in a low pressure mercury vapour discharge such as occurs in known fluorescent lamps emits predominantly in the spectral region of from 610 nm to 620 nm [see spectrum in accompanying FIG. 2a].

(b) Green Phosphor

Magnesium aluminate activated by cerium and terbium of the formula:

and as commercially supplied also by Elgar Phosphors & Chemicals Ltd. under the code number 3003. This material, when illuminated by ultraviolet light (as above) emits predominantly in the spectral region of from 540 nm to 545 nm [see spectrum in accompanying FIG. 2b].

(c) Blue Phosphor

A barium magnesium aluminate activated with divalent europium of the formula

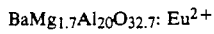

as commercially supplied also by Elgar Phosphors & Chemicals Ltd. under the code number 4001. This material, when illuminated by ultraviolet light as above exhibits peak emission at a wavelength, [as can be seen from the spectrum in FIG. 2c], in the range of 430 nm to 480 nm and has a half peak width of 50 nm.

The mixture of phosphors contained the following proportions by weight of the above phosphors:
  red phosphor: 37%
  green phosphor: 19%
  blue phosphor: 44%

The said mixture was coated onto the inside surface of a glass tube of 1.5 inch diameter and 4 feet in length which was then used to produce a 40 w fluorescent lamp.

This lamp had the co-ordinates on the CIE chromaticity diagram of x equals 0.300 and y equals 0.232.

The lamp also had an output of 2000 lumens (cf. 1100 lumens for the corresponding lamp previously used in aquaria). After 2000 hours in use the lamp had a lumen output equal to 95% of its initial lumen output and showed only minor colour drift (less than 3 SDCM). This compares with a lumen maintenance of the lamp most commonly previously used in aquaria of 82% after 2000 hours, and a large colour drift.

As will be appreciated from the above specific example, this invention provides aquarium lighting which has improved lumen output and maintenance and exhibits only minor color drift. In addition to this it provides a very pleasing subjective effect. There is a marked absence of the reddish cast which the previously commonly used lamp types imparted to almost all colors and it is thus possible for the viewer to appreciate all the many and varied colors of the fish, coral, algae and other objects commonly included in an aquarium, whether of the cold freshwater, tropical freshwater or tropical marine type.

It has further been shown that the lamps of this invention when used over tropical marine aquaria are particularly suitable for the invertebrates such as coral and algae whose individual and symbiotic growth are supported by the lamps. In practical lighting experiments carried out in marine aquaria containing a selected of light dependent marine invertebrates (e.g. mushroom corals, goniapora, anemones and clams) and micro-/macro algae (e.g. Caulerpa sp.), four 20w lamps of this invention gave a substantially higher intensity of illumination, stimulated algal growth and promoted coral health and well being noticably better than the best previously known illumination comprising an elaborate combination of four existing commercially available 20w lamps comprising a 'Grolux' lamp, two 'North Light' lamps and a deep blue lamp. Such a combination is difficult to adjust properly and not easily available to the average home aquarium owner. Our invention, in contrast, provides illumination from a single lamp type which will give at least as good results and avoids these disadvantages.

We claim:

1. A fluorescent lamp for use in aquaria, the luminescent layer in said lamp comprising a mixture of red, green and blue phosphors, the red phosphor emitting predominantly in the spectral region of from 610 nm to 620 nm, the green phosphor emitting predominantly in the spectral region of from 540 nm to 545 nm and the blue phosphor having a peak emission wavelength between 430 nm and 480 nm with the half peak width not exceeding 80 nm, said red, green and blue phosphors being blended to form said mixture in such proportions that the color co-ordinates of the lamp employing said mixture on the CIE chromaticity digram differ from the point x equals 0.300 and y equals 0.232 in any direction by no more than 10 standard deviations of color matching.

2. A fluorescent lamp according to claim 1, for use in a tropical marine aquarium.

3. A fluorescent lamp including a luminescent layer comprising a mixture of red, green and blue phosphors, each phosphor when the lamp is in use emitting light in a respective spectral region, the red phosphor emitting predominantly in the spectral region of from 610 nm to 620 nm, the green phosphor emitting predominantly in the spectral region of from 540 nm to 545 nm and the blue phosphor having a peak emission wavelength in the spectral region from 430 nm to 480 nm with the half peak width not exceeding 80 nm, said red, green and blue phosphors being blended to form said mixture in such proportions that the color coordinates of the lamp employing said mixture on the CIE chromaticity diagram differ from the point x equals 0.300 and y equals 0.232 in any direction by not more than 10 standard deviations of color matching.

4. A fluorescent lamp according to claim 3 wherein x equals 0.300 and y equals 0.232.

5. A fluorescent lamp according to claim 3 wherein the red phosphor is $(Y_a Gd_{1-a})_2 O_3$: $Eu^{3+}$ wherein a is equal to or less than one.

6. A fluorescent lamp according to claim 3 wherein the green phosphor is a cerium or terbium activated aluminate, silicate, phosphate or borate selected from the group of compounds having the following formulae CeMg Al$_{11}$O$_{19}$: Tb Y$_2$SiO$_5$: Ce, Tb LaPO$_4$: Ce,Tb LaMgB$_5$O$_{10}$: Ce, Tb.

7. A fluorescent lamp according to claim 3 wherein the blue phosphor is an alkaline earth hexagonal aluminate of the B-alumina structure, or an alkaline earth chlorophosphate, each activated by divalent europium and selected from the group having the following formulae BaMgAl$_{10}$O$_{17}$: Eu$^{2+}$ BaMg$_{1.7}$Al$_{20}$O$_{32.7}$: Eu$^{2+}$ BaMg$_2$Al$_{24}$O$_{39}$: Eu$^{2+}$ (Sr,Ca,Ba)$_{10}$Cl$_2$(PO$_4$)$_6$: Eu$^{2+}$.

* * * * *